United States Patent
Wang et al.

(10) Patent No.: US 7,596,086 B2
(45) Date of Patent: Sep. 29, 2009

(54) METHOD OF AND APPARATUS FOR VARIABLE LENGTH DATA PACKET TRANSMISSION WITH CONFIGURABLE ADAPTIVE OUTPUT SCHEDULING ENABLING TRANSMISSION ON THE SAME TRANSMISSION LINK(S) OF DIFFERENTIATED SERVICES FOR VARIOUS TRAFFIC TYPES

(76) Inventors: Xiaolin Wang, 126 N. Ranch Rd., Concord, MA (US) 01742; Ajay C. Mahagaokar, 18 Adams St., Westboro, MA (US) 01581; Ray Rajib, 62 Essex Heights, Weymouth, MA (US) 02188; Michael T. Wright, 298 New Boston Rd., Sturbridge, MA (US) 01566

( * ) Notice: Subject to any disclaimer, the term of this patent is extended or adjusted under 35 U.S.C. 154(b) by 949 days.

(21) Appl. No.: 10/702,152

(22) Filed: Nov. 5, 2003

(65) Prior Publication Data
US 2005/0094643 A1   May 5, 2005

(51) Int. Cl.
*H04L 12/56* (2006.01)
*H04J 1/16* (2006.01)

(52) U.S. Cl. .................. 370/230; 370/252; 370/412; 370/419

(58) Field of Classification Search ............ 370/235, 370/237, 238, 412–418, 252, 230, 419, 389, 370/386; 709/305, 238–244
See application file for complete search history.

(56) References Cited

U.S. PATENT DOCUMENTS

| | | | |
|---|---|---|---|
| 6,570,883 B1 | 5/2003 | Wong | |
| 6,914,882 B2 | 7/2005 | Merani | |
| 7,251,218 B2 * | 7/2007 | Jorgensen | .......... 370/235 |
| 2002/0141425 A1 | 10/2002 | Merani et al. | |
| 2003/0033467 A1 * | 2/2003 | Yoshizawa et al. | .......... 710/305 |
| 2003/0174650 A1 * | 9/2003 | Shankar et al. | .......... 370/235 |
| 2004/0136370 A1 * | 7/2004 | Moore et al. | .......... 370/389 |

(Continued)

FOREIGN PATENT DOCUMENTS

EP   0859492   8/1998

(Continued)

OTHER PUBLICATIONS

M. Karol, M. Hluchyj and S. Morgan in "Input versus Output Queuing on a Space-Division Packet Switch," IEEE Transactions on Communications, vol COM-35, No. 12, Dec. 1987.

(Continued)

*Primary Examiner*—John Pezzlo
(74) *Attorney, Agent, or Firm*—McDonnell Boehnen Hulbert & Berghoff LLP

(57) ABSTRACT

A configurable adaptive variable length data packet transmission output scheduler for enabling substantially simultaneous transmission on a common transmission link, as of fiber optics, of differentiated services for various different traffic types, executing different QOS algorithms while co-existing in a converged network environment, with simultaneous preserving of the different service characteristics for real-time or high-priority traffic and providing differentiated bandwidth allocation while achieving maximal link utilization—all through a fine and balanced control as to which type of traffic is transmitted on the link for a given duration, and how much of that traffic is transmitted on the link.

8 Claims, 4 Drawing Sheets

U.S. PATENT DOCUMENTS

2004/0177087 A1* 9/2004 Wu et al. .................... 707/102
2007/0268826 A1* 11/2007 Balakrishnan et al. ...... 370/230

FOREIGN PATENT DOCUMENTS

EP 1225734 7/2002
EP 1345366 9/2003

OTHER PUBLICATIONS

N. McKeown, S. Iyer and R. Zhang in "Routers with a Single Stage of Buffering," Proc. Of ACM SIGCOMM., Aug. 2002.

N. McKeown in "SLIP: A scheduling Algorithm for INput-Queued Switches," IEEE Transactions on Networking, vol. 7, No. 2, Apr. 1999.

Y. Tamie and S.C. Chi, "The Symmetric Crossbar Arbiters for VLSI Communication Switches," IEEE Transactions on Parallel and Distributed Systems, vol. 4, No. 1, pp. 13-27 (1993).

N. McKeown, "A Fast Switched Backplane for a Gigabyte Switched Router," Business Communication Review, Dec. 1977.

* cited by examiner

ABM

METHOD OF AND APPARATUS FOR VARIABLE LENGTH DATA PACKET TRANSMISSION WITH CONFIGURABLE ADAPTIVE OUTPUT SCHEDULING ENABLING TRANSMISSION ON THE SAME TRANSMISSION LINK(S) OF DIFFERENTIATED SERVICES FOR VARIOUS TRAFFIC TYPES

FIELD

The invention is concerned with the simultaneous data packet transmission, as along present-day fiber optic transmission lines or links and the like, of various types of traffic having widely different service and priority characteristics, including high priority real-time voice, video, frame relay traffic, financial transactions, etc., all in the presence of bursty and unpredictable background traffic, and all on the same transmission link(s); being more particularly concerned with the utilizing of the transmission link(s) to full capacity so that substantially no bandwidth is wasted.

BACKGROUND OF INVENTION

Traditional and present-day variable length packet based switching equipments have not been designed from the "ground-up" to support the requirements of converged multi-service networks.

The most common misconception is that present-day protocol mechanisms, such as DiffServ and MPLS, will support the quality of services (QOS) mechanisms required for real-time present-day premium services. While the 8-bit Differentiated Services Code Point (DSCP) and the 3-bit experimental (EXP) field in the MPLS "shim" header may provide a mechanism to classify high-priority service classes into separate queues, they cannot guarantee or enforce that the QOS and SLA requirements of high-priority traffic are satisfied. It is then up to the switching and QOS mechanisms of the routers/switches to attempt to enforce these requirements.

While there have been significant advances in network processor technologies, the performance bottleneck in the router continues to be the switch fabric. The most common switch architecture prevalent in conventional core switching/routing-equipment is based on either the single stage or the multi-stage CIOQ (Combined Input Output Queuing) crossbar switch fabric is sandwiched between two stages of buffering (input as well as output).

In the single stage cross-bar design, for example, the line cards are connected to a crossbar switch fabric which is generally composed of $N^2$ 2×2 switching elements, where N is the number of input/output ports. Incoming packets are buffered at the ingress, and a centralized controller is used to arbitrate all packets waiting at the head of the input queues. The controller schedules all requests from input ports with packet waiting, configures the cross points in the fabric, and finally grants the requests when a path is successfully set up between the input and output ports. The centralized controller, however, presents a performance bottleneck especially for large-scale switches. Such crossbar switch fabric architectures with input queuing, moreover, also suffer from Head-of-line (HOL) blocking that limits the maximum throughput to 58.6% even under uniform traffic scenarios, as described, for example, by M. Karol, M. Hluchyj and S. Morgan in "Input versus Output Queuing on a Space-Division Packet Switch". *IEEE Transactions on Communications*, vol. COM-35, No. 12, December 1987.

Another proposal, Virtual Output Queuing (VOQ), wherein each input port maintains virtual queues, one each for the traffic destined to a specific output port, has also been proposed to eliminate HOL blocking at the ingress, as also described by Karol et al (above). Such a scheme involves virtual queues at the input ports. Queuing at the output is made possible with some switch speedup.

There exists, indeed, a considerable body of analysis on the prior CIOQ architectures, demonstrating that CIOQ switches suffer from unpredictable performance—they cannot offer any throughput, fairness or delay guarantees and the worst case is not even known, as concluded by N. McKeown, S. Iyer and R. Zhang in "Routers with a Single Stage of Buffering", *Proc. Of ACM SIGCOMM*, August 2002; N. McKeown in "SLIP: A Scheduling Algorithm for Input-Queued Switches", *IEEE Transactions on Networking*, vol. 7, No. 2, April 1999; and Y. Tamie and S. C. Chi, "The Symmetric Crossbar Arbiters for VLSI Communication Switches", *IEEE Transactions on Parallel and Distributed Systems*, vol. 4, No. 1, pp. 13-27. January 1993.

Though CIOQ routers make up a large fraction of the Internet infrastructure, CIOQ switches actually suffer from the following performance limitations:

Practical CIOQ routers are incapable of providing predictable and bounded latency/jitter required for real-time applications. In fact, there is a wide range between minimum and maximum latency as well as jitter supported through a practical CIOQ switch. The worst-case latency and jitter values are heavily dependent on the traffic pattern and distribution. As a result, CIOQ routers cannot preserve the service characteristics of ATM and Frame Relay services-a requirement to support the converged core.

CIOQ switch architectures show blocking behavior under a variety of real-life non-uniform traffic patterns, even for moderate (35% to 40%) switch fabric utilizations. Latency through the switch can range from 10's of µs to 100's of milliseconds for higher utilizations. Moreover, traffic admittance decisions are made at the inputs to the CIOQ crossbar fabric. Lack of knowledge of output queue state results in sub-optimal decisions at the input resulting in inefficient link utilizations. For instance, traffic could be dropped at the input through Random Early Discard (RED) mechanisms even though some of the outputs do not experience congestion. This causes incoming traffic to be clipped even when egress link bandwidth is available.

Scheduling algorithms used in CIOQ crossbar switches cannot guarantee bandwidth for different premium traffic classes. Only strict priority can be supported to the switch fabric by the crossbar scheduler, as concluded by N. McKeown, "A Fast Switched Backplane for a Gigabyte Switched Router", *Business Communication Review*, December 1997. This implies that services such as VoIP, video, guaranteed IP-VPN and layer to services such as ATM and Frame Relay, each with its own unique bandwidth allocation, cannot be supported through a CIOQ router. The presence of WFQ schedulers at the address line card is not sufficient to support differentiated services if the switch fabric is blocking and the premium packets are not forwarded across the fabric to the egress in time. Thus, it is critical that QOS enforcement and bandwidth management is accomplished in the switch fabric in addition to the line cards.

Conventional equipment based on CIOQ switch architecture has a very noticeable difference between average and worst-case latency as well as jitter. Worst-case latency and jitter are completely unpredictable and can be as high as 100's of milliseconds for certain traffic patterns even at moderate utilizations. Consequently, ATM-grade SLAs cannot be supported for real-time IP services. In addition, burstable services similar to those offered in ATM and Frame Relay is not possible with conventional equipment because the state of the egress queues is not known at the ingress. For instance, packets could be dropped at the ingress to the switches and not allowed to burst even though bandwidth may be available at the egress.

The above and other limitations of existing data transmission systems and techniques that carriers provide for the myriad of such different types of data traffic, with their costly infrastructures of varied traffic switching networks and routes, including those above-described, moreover, unfortunately enable only a low percent of utilization (often only about 20%) of the transmission link capacity. This is because, as above explained, they are unable to provide the required service quality without degradation, particularly over long distances, of the full and varied characteristics required for particular different types of data packets having different service characteristics and widely different priorities of traffic transmission along the links.

Underlying the present invention, on the other hand, is the discovery of a methodology and technique that provides for normal configurable adaptive output variable length data packet transmission scheduling, and in such a manner that it remarkably enables the full and varied characteristics of all these different types of data packets—all ranging from high priority real-time voice, to financial transactions or the like—to be met on a common transmission link and data transmission flow, while utilizing the full capacity of the link so that there is no waste of bandwidth.

This is achieved, in accordance with the invention, with the aid of novel programmable converged network routers.

In current markets, indeed, there is need for converged networks to reduce capital and operational expenditures. In these converged networks, different types of traffic (like the before-mentioned high priority real-time voice, video, frame relay traffic, etc.) must co-exist with best effort or background traffic on the same link. Thus the converged network routers must preserve traffic characteristics (like bounded latency in general along with bandwidth allocation) of high priority or real-time traffic in the presence of bursty, unpredictable background traffic on the same link. Simultaneously, there is the need for utilizing the link to its full capacity, as earlier stated, so that no bandwidth is wasted on the link.

The invention, accordingly, through its novel programmable converged router control, provides a new algorithmic approach which allows customers to meet the objectives of simultaneous a) preserving of service characteristics for real-time or high-priority traffic, b) bandwidth allocation, and c) maximal link utilization. This is achieved by fine and balanced control of two main characteristics of traffic on the converged network router link: 1) which type of traffic is being transmitted on the link for a given duration, and 2) how much of that traffic is transmitted on the link, all as hereinafter fully detailed.

In accordance with the invention, moreover, the adaptive output scheduler is capable of executing several different quality of service (QOS) algorithms, such as weighted fair queuing (WFQ) strict priority, (SP), round-robin (RR), etc. at an egress port of an electronic data switch fabric (ESF) switch/router that provides differentiated services for various traffic types. The scheduling node with its order of transmission, and the bandwidth allocation management are achieved independently of one another, thereby enabling the router to provide such different services and along a simultaneous data traffic flow somewhat in a kind of "multiplex" fashion. The bandwidth management of the invention, moreover, also implements a full "work-conserving" mode where no bandwidth is ever wasted on an interface and where excess unused bandwidth in one packet data queue may be allocated to another queue that can utilize the same.

OBJECTS OF INVENTION

A principal object of the invention, accordingly, is to provide a new and improved method of and apparatus for variable length data packet transmission, preferably using a novel programmable converged network router, that shall not be subject to the above-described and other limitations of prior art approaches, but, to the contrary, by the use of novel configurable adaptive output scheduling, enable the simultaneous carrying of differentiated services for various traffic types on the same transmission link(s) and with preservation of each of the corresponding various traffic characteristics and respective priorities, and with full utilization of link capacity and no waste of bandwidth.

A further object is to provide a novel configurable adaptive output scheduler of more general utility, as well.

Other and further objects will be explained hereinafter and are more particularly delineated in the appended claims.

SUMMARY OF INVENTION

In summary, from one of its important viewpoints, the invention embraces a variable length data packet traffic managing method of providing adaptive bandwidth management and scheduling to a data packet switch/router system in a converged network environment that receives different types of data packet traffic flow having different specific customer-assigned service requirements such as definition of service, priority, delay, jitter and bandwidth characteristics, and for routing the data packet flow to a common communication link for simultaneous transmission flow along the common link, the method comprising, allocating different amounts or percentages of bandwidth to each type of data packet traffic in accordance with its respective customer-assigned service requirements; and scheduling the departure order of the different types of traffic flow from the router to the communication link based upon and adapted to said respective service requirements, and with preservation of the respective various traffic characteristics and priorities, whereby the switch/router provides differentiated services for the various data traffic types, while simultaneously substantially filling the total data packet flow capacity utilization of the link.

Preferred and best mode implementations and apparatus and software designs are hereinafter fully detailed.

DRAWINGS

The invention will now be described with the exemplary illustrations afforded by the accompanying drawings in which FIG. 1 is a block diagram illustrating a router link of a preferred embodiment of the invention for the illustrative example of four classes or types of data transmission traffic or service;

DESCRIPTION OF PREFERRED EMBODIMENT(S) OF INVENTION

Figure 1:
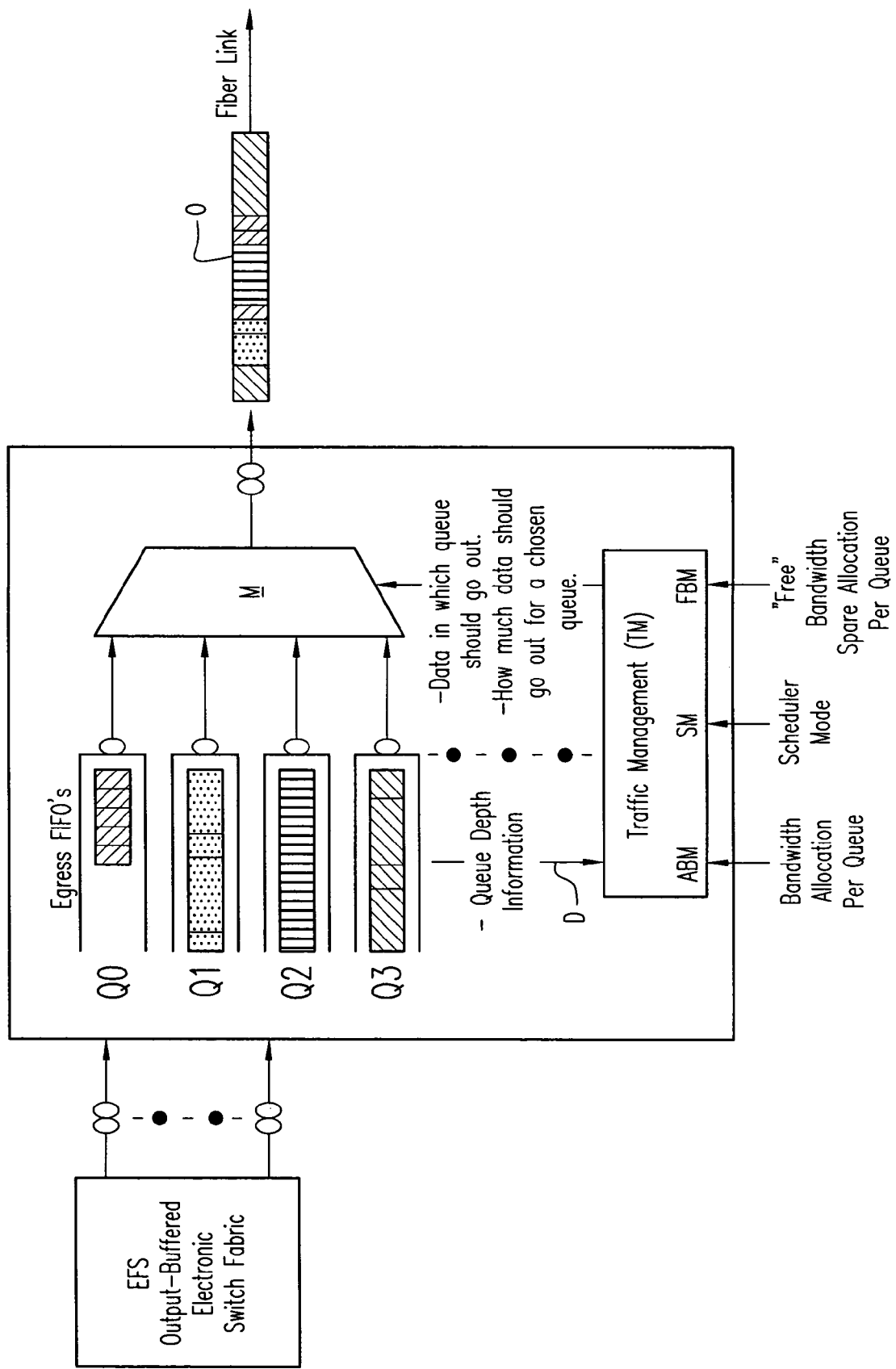

An example in a data switched fabric system (ESF) of a preferred switch/router system for the novel converged network of the invention is shown in previously described FIG. 1, wherein ingress ports from the switch/router, so-labeled, send FIFO queues of data packets, illustrated as four, Q0-Q3, for novel traffic management at TM. Preferably these come from the type of output-buffered shared memory system described in U.S. patent application publication number 2003/0043828A1, Mar. 6, 2003, Method Of Scalable Non-Blocking Shared Memory Output-Buffered Switching Of Variable Length Data Packets From Pluralities Of Ports At Full Line Rate, And Apparatus Therefor (U.S. patent application Ser. No. 09/941,144, filed Aug. 28, 2001), preferably addressed by the technique of U.S. patent application publication number 2003/0120594A1, Jun. 26, 2003, Method Of Addressing Sequential Data Packets From A Plurality Of Input Data Line Cards For Shared Memory Storage And The Like, And Novel Address Generator Therefor (U.S. patent application Ser. No. 10/026,166, filed Dec. 21, 2001). Other systems may also be suitable for some applications, but the use of these preferred shared-memory techniques, however, provides the advantage of scalable-port non-blocking shared-memory output-buffered variable length queued data switching and with sequential data packet addressing particularly adapted for such shared memory output-buffered switch fabrics and related memories.

These illustrative four queues of FIG. 1 represent four different classes or types of data traffic or service [as examples, CBR (constant bit rate), VBR-rt (variable bit rate real-time), VBR-nrt (variable bit rate not real-time), and UBR (unconstant bit rate), as used in ATM (asynchronous transfer mode) terminology]. Various corresponding ingress links of a router R send data to particular associated output or egress queues. A multiplexer-like function is achieved at gate M, wherein data from these queues is sent in the form of successive packets on the output link O. Based on specific customer needs, three parameters may be set up for the four egress queues of the output link. These parameters are:

a) Scheduling priority: The setting SM of FIG. 1 decides the priority or departure order in which the queues are serviced (i.e. which queue is allowed to transmit data on the egress link 0). While multiple modes of scheduling can be implemented, current networking needs can well be met by two modes, Round Robin and Strict Priority. In the round robin mode, Q0 is serviced followed by Q1, followed by Q2, followed by Q3 and then back to Q0. In the priority mode, Q0 has highest priority and Q3 has the lowest priority. Thus, after sending a packet from Q0, a packet from Q1 can be sent only if there are no packets to send from Q0. A packet from Q3 will be sent only if there are no remaining packets in Q0, Q1 and Q2. The scheduling priority, however, does not govern how much data is sent from a selected queue, b) Bandwidth allocation: The setting ABM decides how much data should be sent out from a given queue once a decision is made to service that queue (based on scheduling priority). An appropriate number of data bytes are then sent from a queue, providing the queue with its allocated bandwidth.

c) "Free" or unused bandwidth usage per queue (setting FBM): One of the goals of converged networks is to maximize the utilization of the egress link 0. There are cases; however, where for some duration, a queue may not have enough data to send to fill its allocated bandwidth. In such a case, some of its allocated bandwidth becomes "unused" or "free". At the same time, there might be other queues that have more data to send than their allocated bandwidth. Tremendous cost savings are achieved if "unused" bandwidth from one queue can be distributed to other queues needing that bandwidth. The invention enables the control of the proportion in which such "unused" bandwidth may be used by other needy queues, and this is enabled by the present invention. The invention enables customer control of this proportion of unused bandwidth usage.

The above three settings of parameters or "knobs" or controls ABM, SM and FBM, therefore, allow the customer to achieve the customer business goals of converged networks. This guarantees the upper bound of latency and jitter for real-time or high-priority traffic, along with maximal utilization of the egress link. This also allows specific bandwidth guarantees for various queues.

In FIG. 1, an exemplary setting has resulted in a particular sequence and number of packets from each of the illustrative four queues transmitting data on the same egress link 0.

In this illustrative scheduling, the first of the "multiplexed" data packet blocks at the egress 0 for transmission along the common fiber link with successive, but simultaneous transmission flow; are packets from Q3 (shown with line shading at 45° to the vertical), departing first; the next adjacent packets are then from Q1 (shaded with dots); the next and smaller adjacent packet is from QO (shaded at −45° to the vertical); then adjacent packets from Q2 (heavy vertical shade lines); next, packets from QO, again; and finally in departure order, packets from Q3 again.

To achieve this operation, however, it is necessary that the traffic management TM has internal knowledge of the actual queue depth of each of the queues Q0-Q3 for a given egress link, so that the TM is aware of the presence of data in the queues. This is shown accomplished by the "Queue Depth Information" sensing path, so-labeled and referenced at D, and later more fully described.

It is now in order more fully to describe how Traffic Management (TM) achieves the fine control mentioned earlier with its three input settings from the customer and its internal knowledge of queued depth of each of the illustrative four queues for a given egress link that provides awareness of presence of data in a queue.

Algorithmic Approach

Figure 2:
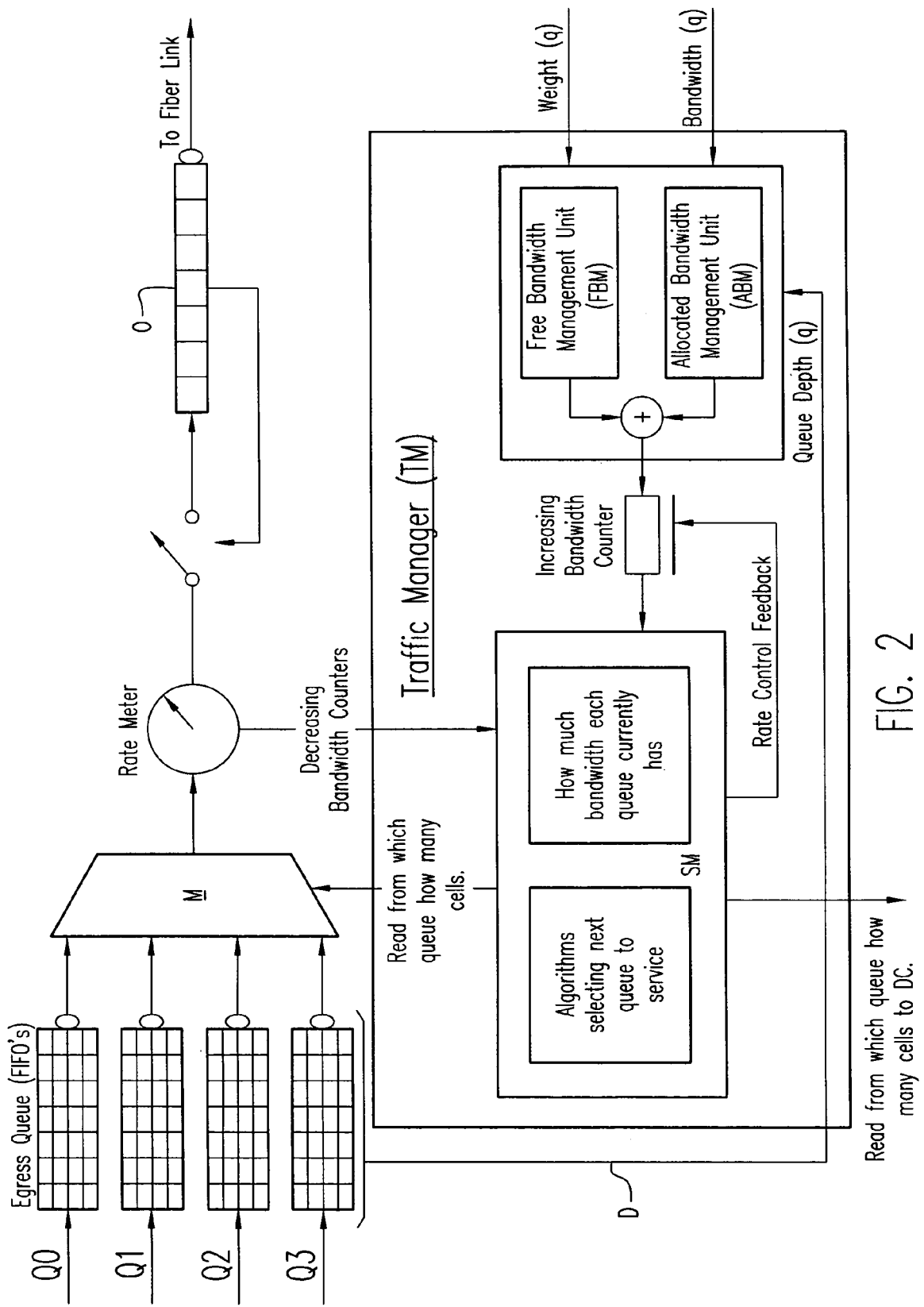
FIG. 2 is a similar but more detailed diagram as to the components of the traffic manager.

In FIG. 2, accordingly, more details are provided for the algorithmic programming approach to govern the queue servicing order and the amount of data sent from a queue at any given time.

Three algorithms are at play: de-queue scheduling—the before-mentioned SM, the allocated bandwidth distributing ABM, and the "free" or "unused" bandwidth distributing FBM. These enable the traffic management. The ABM task is to satisfy the bandwidth assigned to each queue through the bandwidth allocation setting. The amount of bandwidth allocated to each queue is the minimum of bandwidth allocated for the amount of data present in the queue. The "unused" bandwidth is the difference between the two when the data amount present in the queue is less. The "free" bandwidth management FBM distributes "unused" bandwidth to a queue needing bandwidth based on the "weight" setting later more fully explained, and the "free" bandwidth setting.

As more particularly shown in FIG. 2, allocated and "free" bandwidth together (ABM and FBM) determine the bandwidth given to each queue. The scheduler SM decides which queue is to be serviced and how much from that queue. The scheduler SM bases on the packet boundary if bandwidth managements are off. Otherwise, it services the only queues with bandwidth available.

The Traffic Management TM, furthermore, tracks the bandwidth based on the size of the packet payload. The packet header attached to each packet is calculated on the line card. The size of a packet encapsulation varies depending on the protocol applied. Traffic Management, however, has no information of header size and cannot figure out the exact bandwidth for each queue. Traffic Management only schedules data out with a minimum over speed. This may lead to filling up the output FIFO which may add unnecessary delay and jitter to timing-sensitive packets. Less accumulation, on the other hand, may result in holes in the output line. A feedback signal from an output FIFO to Traffic Management therefore indicates the amount of accumulation in the output FIFO. It matches the scheduling rate of Traffic Management to the output line rate and keeps the output FIFO accumulation at a proper level, as later more fully explained.

Output FIFO O, the Rate Meter, and the Rate Controller (one below the "increasing Bandwidth Counter" of FIG. 2) together construct a feedback loop. When SM since data at a rate higher than output line rate, the output FIFO O will start accumulating. Once the amount of accumulation reaches the FIFO limitation, it turns off to switch to avoid data loss. The Rate Meter measures the rate through the amount of accumulation changing and passes the information to the Rate Controller through the Rate Control Feedback. When the accumulation crosses a threshold and continues increasing the Rate Controller reduces the scheduling rate but equally scaling down the bandwidth assigned all queues. It increases the scheduling rate, on the other hand, when the accumulation is below that threshold.

It is now in order to describe specific operational details of each of the Allocated Bandwidth Management (ABM), "Free" Bandwidth Allocation Management (FBM) and the Scheduler Manager (SM).

Allocated Bandwidth Management (ABM)

Figure 3:
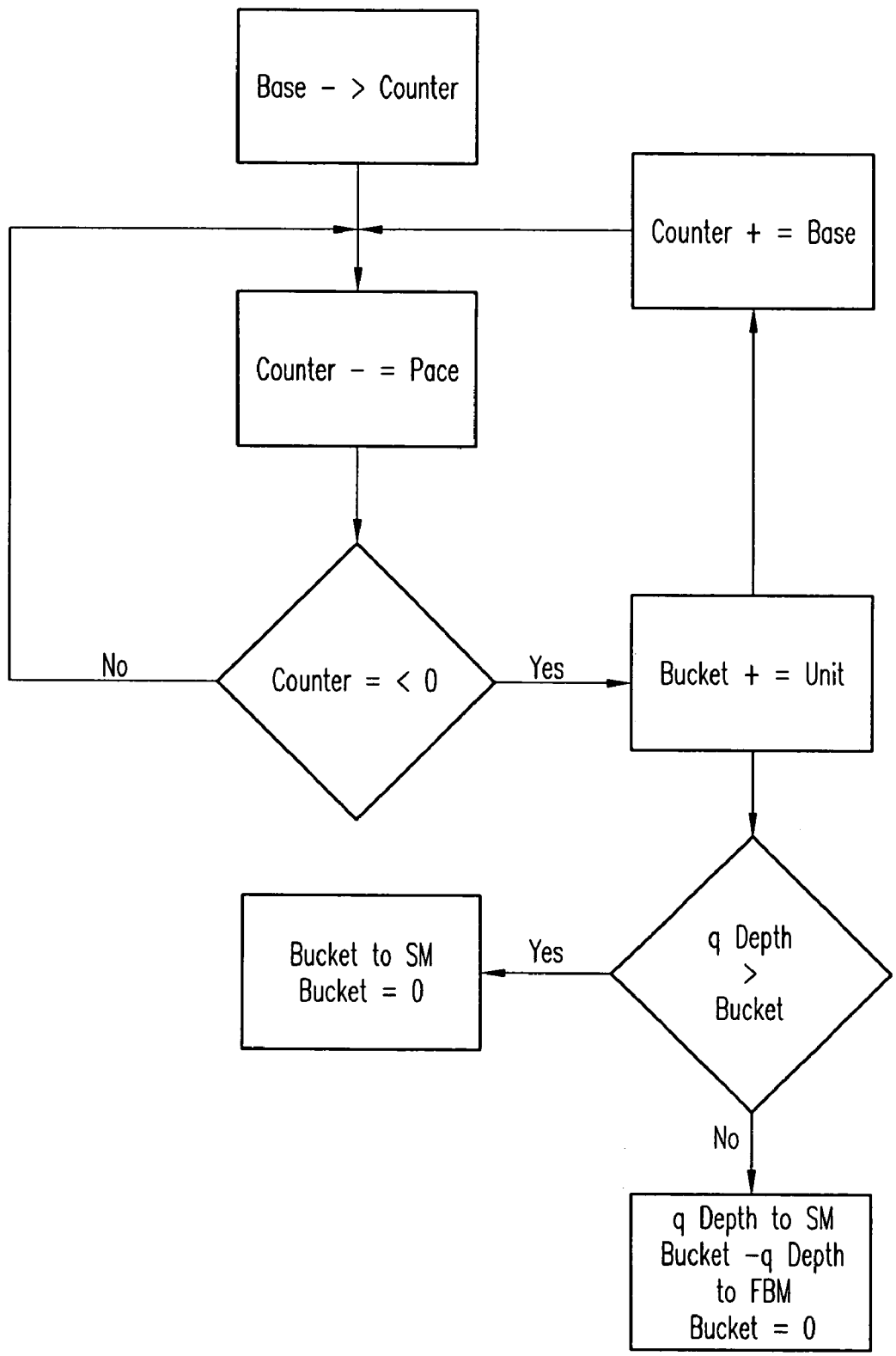
FIG. 3 is a block circuit or functional diagram of the apparatus and operation of rate control flow, including counters and an accumulating "bucket" for portions of freely available bandwidth in the queues.

In the more detailed showing of the allocated bandwidth management (ABM) unit in FIG. 2, it is indicated that ABM distributes bandwidth to each queue based on the bandwidth assigned to each queue through a rate control base assigned to a corresponding rate control counter, a decreasing counter more fully shown in FIG. 3. When a rate counter count expires, the counter is less or equal to zero. ABM then provides the queue with a fixed amount of bandwidth—termed "Unit". In the meantime, ABM reloads the counter with its base. The period in which a rate control counter expires and the size of "Unit" together, reflects the allocated guaranteed bandwidth customer setup for each queue.

ABM compares the amount of data present in the queue and the allocated bandwidth; and whichever is smaller, is assigned to that queue; When there is not enough data in the queue, the excess bandwidth will be handed to a "free" bandwidth "bucket" for accumulation for other queues needing to use this excess bandwidth, as earlier and as hereinafter more fully described.

The details of the before-mentioned rate control counter are shown in FIG. 3, with each ABM having such a rate control counter, dedicated to an egress queue and behaving like a clock.

During system initialization, software sets up the previously mentioned rate control base, setting a corresponding rate control counter according to the bandwidth assigned to that queue. The value in the base register is then assigned to the corresponding counter register that is decreasing at a given pace. When the counter crosses zero, a certain amount of data or data unit is scheduled to be sent from the corresponding queue by adding it to the credit "bucket" of the queue. The value in the base register will afterwards be added to the counter register.

The amount of data scheduled for different queues is always the same data unit. The allocated bandwidth for each queue, however, is reflected in the base assigned by the software. The rate is based on an ideal case—that each packet will have a certain number H of header bytes, and that the size of the payload does not vary with the protocol. In general, this ideal situation does not, however, exist because the bandwidth manager optimizes the line output based on the information available to it. Frequently it is possible that the line card, based on protocols, will modify the data sent by the electronic data switching fabric ESF. Hence, the scheduled rate is only an estimate and may be different from the actual output line rate. A feedback control system, later described in detail, is thus used to adjust the difference between the ideal and realistic cases by increasing or decreasing the amount of data scheduled on zero crossing of the rate control counter.

The decision as to how much bandwidth is to be assigned to the "free" bandwidth "bucket" may be determined by the following conditions.

If the data present in the queue is greater than or equal to the before-mentioned "Unit", assign the "Unit" to the allocated bandwidth for that queue, with no bandwidth for the "free" "bucket".

Otherwise, assign the amount of data present in that queue to the allocated bandwidth for that queue, and assign the difference ("Unit"—the data in queue) to the "free" bandwidth "bucket".

"Free" Bandwidth Management (FBM)

When the total bandwidth of an interface has not been fully allocated to the queues, that portion of the line bandwidth is made freely available, as earlier described, without crediting or debiting any queue. "Free" bandwidth may vary with time. The queue contributing to "free" bandwidth is not in this application credited for its contribution.

In accordance with the invention, one set of the counters of FIG. 3—the rate control base register, rate control counter and credit bucket—is not assigned to any particular queue, but rather is dedicated to FBM for each line card. When the rate control counter crosses zero, as earlier described, it adds a unit bandwidth to the credit "bucket". The "free" bandwidth from the allocated bandwidth management (ABM) is also added to this credit "bucket".

Each queue is provided with a base weight register, earlier alluded to, called a "Free" Bandwidth Weight Register and a weight counter (see "weight" in FIG. 2). The users may control the percentage of "free" bandwidth distributed to different queues by assigning weights to their Free Bandwidth Weight Register. The FBM assigns the bandwidth to a queue based on their weights, on the amount of data present in memory, and on the "free" bandwidth available. If there is not enough "free" bandwidth for a queue, FBM will wait for the next time "free" bandwidth is available, and will start where it stopped the last time until the counter reaches or crosses zero. After the last queue is served, FBM will re-load the counter from corresponding weight registers.

Figure 4:
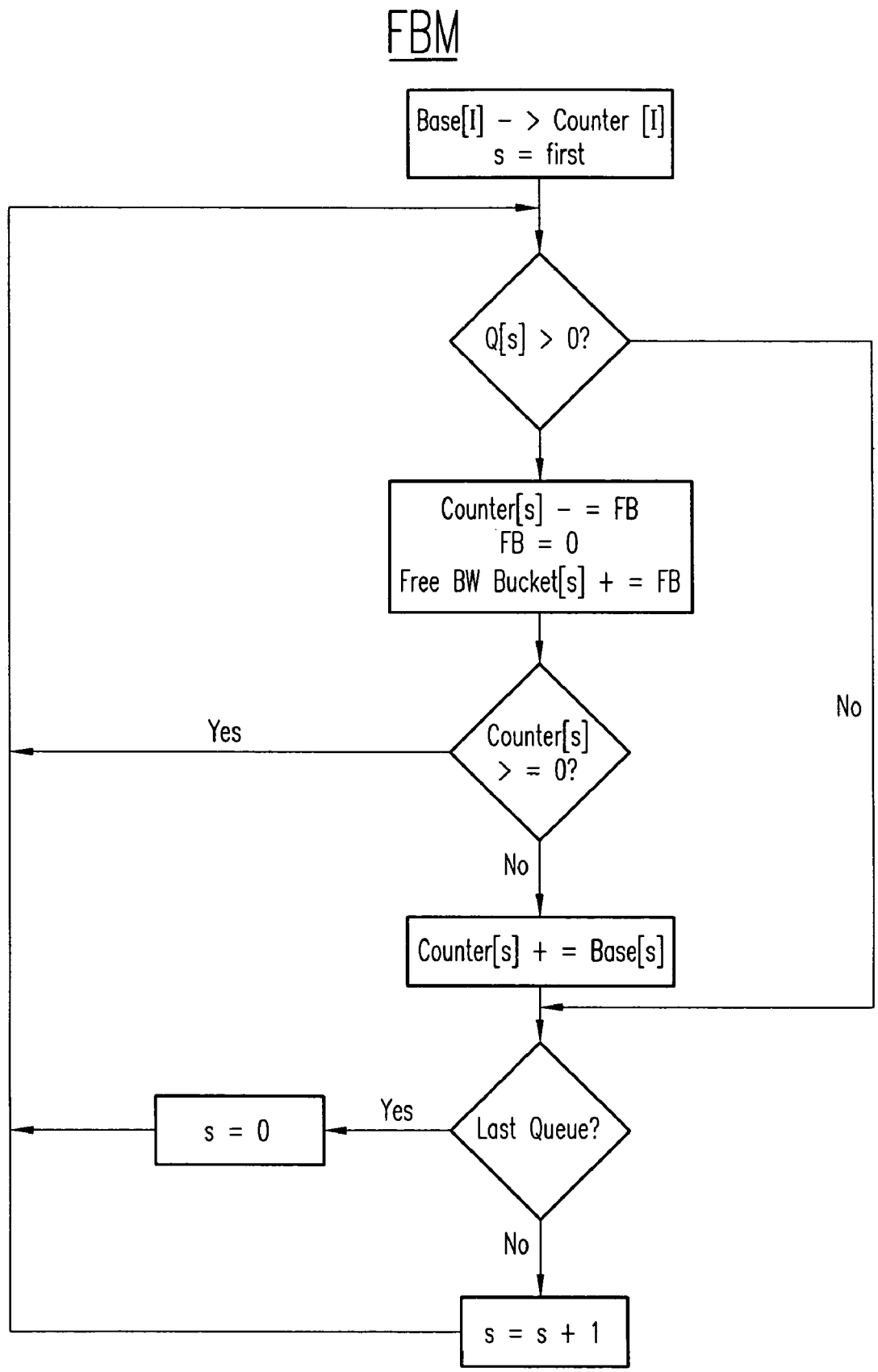
FIG. 4 is a flow chart illustrating the procedure for "free" bandwidth assignments.

This "free" bandwidth distribution procedure is outlined in the flowchart of FIG. 4 where, Q[s] is the status of queue[I], FB is "Free" Bandwidth available, base[I] is Free Bandwidth Weight Register for queue[I], counter[I] is the counter corresponding to queue[I], and FreeBw[I] is the "free" bandwidth assigned to queue[I].

When all queues are empty, the "free" bandwidth must be thrown away. In another words, the life cycle of "free" bandwidth is only one period.

De-queue Scheduler

As discussed earlier, the Allocated and "Free" Bandwidth Management (ABM and FBM) distribute bandwidth for each egress queue to the de-queuing scheduler SM. The bandwidth of a particular queue from both Allocated and "Free" Bandwidth Management are added to a corresponding Deficit Counter. The De-queue Scheduler keeps track of the bandwidth available for each queue through such a Deficit Counter for that egress queue. Positive Deficit Counter state implies that the corresponding queue has bandwidth available, while negative Deficit Counter state indicates that the corresponding queue has used more bandwidth than was distributed by the bandwidth management.

At a given time, the De-queue Scheduler decides which queue should transfer out its data packet. When Bandwidth Management is on, only queues with positive Deficit Counters are first chosen for packet transfer, while the queues with negative Deficit Counter will not be scheduled until their Deficit Counters become positive.

When the De-queue Scheduler receives the bandwidth (in bytes) for a queue from the Bandwidth Manager, it adds that value to the Deficit Counter for that queue. After transferring a packet to the line card, the De-queue Scheduler subtracts the packet byte count from the Deficit Counter. Since data must be transferred on packet boundaries, upon initiating a packet transfer, the De-queue Scheduler has to send the entire packet before starting data transfer from another queue. If sending a packet takes more bandwidth than is available for that queue, its Deficit Counter will be negative.

Ideally, summation of Deficit Counters ($\Sigma_{DeficitCounters}$) is zero. Since scheduling by Bandwidth Management does not exactly match the line rate, the summation of Deficit Counters may be offset from zero. A positive summation indicates that scheduling speed is greater than physical line rate (absorbed by FIFOs on the line card), while negative summation suggests that the scheduling speed is less than the physical line rate. The De-queue Scheduler sends the summation to the Bandwidth Manager; based on that, the Bandwidth Manager will control the rate for distributing the bandwidth. For queues with positive Deficit Counter and data in their output FIFOs, the De-queue Scheduler supports few common algorithms, such as strict priority and round robin.

The fact that, in accordance with the invention, the scheduling mode and bandwidth management are achieved independently of one another, enables the router to provide the differentiated services for various traffic types during simultaneous or continuing data flow transmission.

Bandwidth Equalization (BWEQ)

Network processes change the encapsulation of the data packet and thereby its size. Over-subscribing the physical line, maximizes system throughput but worsens the jitter; whereas under-subscribing the physical line, leads to better jitter, but creates data holes on the line. Both jitter and holes on the output line have to be minimized. This is done in this invention by the before-mentioned use of feedback—involving a Bandwidth Equalizer, which is a 2-stage feedback control system that automatically dynamically equalizes the rate between the physical line, the de-queue Scheduler and the Bandwidth Manager.

The first stage of the BWEQ is between the line card and the De-queue Scheduler. The line card has a FIFO, which absorbs the data from the electronic switch fabric ESF. The feedback signal D in FIG. 2 from the line card to the Traffic Manager indicates the data-containing status of that FIFO. The feedback signal controls the rate from the De-queue Scheduler to line card. Based on the feedback control signal, the De-queue Scheduler justifies data transfer speed. The in-balance of De-queue Scheduler and Bandwidth Managements results in the offset of $\Sigma_{DeficitCounters}$ from 0.

The second stage of the BWEQ is between De-queue Scheduler and Bandwidth Management. As described earlier, the De-queue Scheduler maintains a set of Deficit Counters, one per queue. A positive value (+) in a Deficit Counter indicates the corresponding queue has bandwidth available for data transfer; while a negative value (−) indicates that the queue has used excessive bandwidth for data transfer. The summation of Deficit Counters quantitatively shows the rate difference between Scheduler and Bandwidth Management. When $\Sigma_{DeficitCounters}$ is positive, the Bandwidth Manager is over-subscribing the line and must slow down. If, however, $\Sigma_{DeficitCounters}$ is negative with non-empty queues, the Bandwidth Manager is under-subscribing the line and must speed up. Bandwidth Manager controls the rate by increasing or decreasing the Data Unit associated with all rate control counters.

The following parameters determine the performance of BWEQ: $F_{lcfifostatus}$, is the frequency of sending line card FIFO status; it defines how often the equalization takes place. Another parameter is the "pace" for rate justifying. Currently, in prototype equipment of the assignee of this application, 10 most significant bits of $\Sigma_{DeficitCounters}$ are used to update the data "Unit" associated with rate control counters to justify the rate of bandwidth managements. The "pace" of justification is proportional to the size of offset.

Further modifications will also occur to those skilled in this art, and such are considered to fall within the spirit and scope of the invention as defined in the appended claims.

What is claimed is:

1. In a switch/router that routes variable length data packets in a converged network environment, a method comprising:
   receiving a plurality of data packet flows, each received data packet flow of the plurality having respective customer-assigned service requirements, including definition of service, priority, delay, jitter and bandwidth characteristics;
   directing the received data packet flows to corresponding egress queues;
   allocating amounts of bandwidth to each data packet traffic flow of the plurality of data packet flows in accordance with the respective customer-assigned service requirements by:
      selecting amounts of bandwidth assigned to each of the egress queues and determining an amount of data to be released from each egress queue;
      monitoring an occupancy of each egress queue to determine an amount of unused bandwidth that is allocated to but not used in any given egress queue;
      managing the unused bandwidth in a repository for unused bandwidth, so as to be available for allocation to other egress queues that can utilize the unused bandwidth; and
      making at least a portion of the unused bandwidth available from the repository for use by another egress queue that has more data to send than the allocated bandwidth will permit; and scheduling a departure order of the each of the plurality of data packet traffic flows from the switch/router to a common communication link based upon and adapted to the respective customer-assigned service requirements, by selecting, independently of bandwidth allocation, at least one of an order and a priority of data packet release from the egress queues to the common communication link, whereby the switch/router provides differentiated services for the plurality of data packet traffic flows, while simultaneously substantially filling a total data packet flow capacity utilization of the common communication link.

2. The method of claim 1 wherein making at least a portion of the unused bandwidth available from the repository for use by another egress queue comprises making the unused bandwidth available for use without crediting or debiting any egress queue.

3. The method of claim 2 wherein each egress queue is provided with a base weight system and counter to enable users to control a percentage of unused bandwidth distributed among the egress queues, and wherein making at least a portion of the unused bandwidth available from the repository for use by another egress queue comprises assigning unused bandwidth to another egress queue based upon weights of the weight system, an amount of data present in queue memory, and on the unused bandwidth available.

4. The method of claim 1, wherein allocating amounts of bandwidth comprises allocating percentages of bandwidth.

5. A switch/router that routes variable length data packets in a converged network environment, the switch/router comprising, in combination:

means for receiving a plurality of data packet flows, each received data packet flow of the plurality having respective customer-assigned service requirements, including definition of service, priority, delay, jitter and bandwidth characteristics;

means for directing the received data packet flows to corresponding egress queues;

means for allocating amounts of bandwidth to each data packet traffic flow of the plurality of data packet flows in accordance with the respective customer-assigned service requirements through:

means for selecting amounts of bandwidth assigned to each of the egress queues and determining an amount of data to be released from each egress queue;

means for monitoring an occupancy of each egress queue to determine an amount of unused bandwidth that is allocated to but not used in any given egress queue;

means for managing the unused bandwidth in a repository for unused bandwidth, so as to be available for allocation to other egress queues that can utilize the unused bandwidth; and means for making at least a portion of the unused bandwidth available from the repository for use by another egress queue that has more data to send than the allocated bandwidth will permit; and means for scheduling a departure order of the each of the plurality of data packet traffic flows from the switch/router to a common communication link based upon and adapted to the respective customer-assigned service requirements, by selecting, independently of bandwidth allocation, at least one of an order and a priority of data packet release from the egress queues to the common communication link, whereby the switch/router provides differentiated services for the plurality of data packet traffic flows, while simultaneously substantially filling a total data packet flow capacity utilization of the common communication link.

6. The switch/router of claim 5 wherein means for making at least a portion of the unused bandwidth available from the repository for use by another egress queue comprise means for making the unused bandwidth available for use without crediting or debiting any egress queue.

7. The switch/router of claim 6 wherein each egress queue is provided with a base weight system and counter to enable users to control a percentage of unused bandwidth distributed among the egress queues, and wherein means for making at least a portion of the unused bandwidth available from the repository for use by another egress queue comprise means for assigning unused bandwidth to another egress queue based upon weights of the weight system, an amount of data present in queue memory, and on the unused bandwidth available.

8. The method of claim 5, wherein means for allocating amounts of bandwidth comprise means for allocating percentages of bandwidth.

* * * * *

UNITED STATES PATENT AND TRADEMARK OFFICE
CERTIFICATE OF CORRECTION

PATENT NO. : 7,596,086 B2  Page 1 of 1
APPLICATION NO. : 10/702152
DATED : September 29, 2009
INVENTOR(S) : Xiaolin Wang et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 949 days.

should read (*) Notice: Subject to any disclaimer, the term of this patent is extended or adjusted under 35 U.S.C. 154(b) by 1,097 days.

Signed and Sealed this

Twentieth Day of April, 2010

David J. Kappos
*Director of the United States Patent and Trademark Office*